United States Patent

Hoffmeister

[15] 3,637,050
[45] Jan. 25, 1972

[54] DENTAL ANGLE HANDPIECE HEAD

[72] Inventor: Erich Hoffmeister, Biberach/Riss, Germany

[73] Assignee: Kaltenbach & Voigt, Bismarckring, Germany

[22] Filed: Mar. 11, 1970

[21] Appl. No.: 18,594

[30] Foreign Application Priority Data

July 11, 1969 Germany.....................P 19 35 342.5

[52] U.S. Cl. ..................................184/6 R, 32/27, 308/187
[51] Int. Cl...........................................A61c 1/10, F16n 1/00
[58] Field of Search......................32/26, 27; 184/6, 105, 1 R, 184/1 D, 6 W; 308/187, 228

[56] References Cited

UNITED STATES PATENTS

| | | | |
|---|---|---|---|
| 2,706,667 | 4/1955 | Kaczor.....................................184/1 X |
| 2,263,808 | 11/1941 | Hutchinson...........................184/6 UX |
| 3,426,429 | 2/1969 | Hoffmeister et al. .......................32/27 |
| 3,112,417 | 11/1963 | Tamm................................308/187 X |
| 2,872,257 | 2/1959 | Brown et al............................308/187 |
| 1,982,366 | 11/1934 | Baninger............................308/187 X |
| 2,605,148 | 7/1952 | Shoup..............................308/187 X |

Primary Examiner—Manuel A. Antonakas
Attorney—Waters, Roditi, Schwartz & Nissen

[57] ABSTRACT

A dental angle handpiece head has a rotor shaft mounted in ball bearings which are lubricated through respective holes at opposite ends of the head, the holes opening externally and leading to annular spaces between the inner and outer races of the bearings. The holes have two portions of different diameter to form a step therebetween the outer hole portion being of larger diameter. The inner hole portion is inclined towards the axis of rotation of the rotor shaft in a direction away from the head and also in the direction of rotation of the shaft from the outside to the inside of the housing.

4 Claims, 2 Drawing Figures

PATENTED JAN 25 1972

3,637,050

DENTAL ANGLE HANDPIECE HEAD

BRIEF SUMMARY OF THE INVENTION

The invention relates to a dental angle handpiece head, and particularly to a turbine angle handpiece head with a rotor shaft mounted in ball bearings and in which a tool, e.g., a burr can be inserted.

In turbine angle handpiece heads known hitherto, the ball bearings are provided at the side remote from the turbine impeller with an annular closure cover which has one or more lubricating holes. The head housing is closed at the end wall opposite the tool end of the rotor shaft by a more or less securely inserted cover part, whereas the other end wall is made in one piece with the cylindrical outer wall of the head housing. In the case of turbine angle handpiece heads operated with pure compressed air, i.e., wherein the compressed air does not have any oil addition, and also in the case of angle handpiece heads provided with gearwheel drives, separate lubrication of the ball bearings is necessary about once per week. In order to enable such separate lubrication to be carried out, hitherto in the case of the known angle handpiece heads, the cover part has had to be removed, bearings removed together with the rotor, so that the fine tube nozzle of a grease gun could be inserted in the lubricating hole or holes in the closure covers of the ball bearings.

This method of separate lubrication is very time consuming and therefore is sometimes neglected by dentists, which results in damage to the ball bearings.

An object of the invention is to provide a dental angle handpiece head wherein subsequent lubrication of the ball bearings is possible without it being necessary to dismount and refit the rotor and ball bearings in a cumbersome manner.

To solve this problem, the invention provides that in each of the two end walls of the head housing which are fixed relatively to the outer wall of the head housing, there is arranged at least one lubricating hole, directed towards annular spaces situated between the inner races and the outer races of the ball bearings.

This construction permits lubrication to be carried out in a very simple manner, since it is simply necessary at the given time to insert the fine tube nozzle of a grease gun in a lubricating hole in an end wall of the head housing. Surprisingly, it has been found that because of the small size of the lubricating holes, no considerable entry of dust or the like from the outside into the interior occurs, nor is there any considerable escape of grease or oil from the bearings towards the outside. Ball bearings when removed in the conventional known manner from the head housing collect dust and become soiled to a greater extent than with the arrangement according to the present invention. Furthermore, ball bearings often become damaged when removed in the conventional manner. This is reliably obviated by the present invention.

In a further development of the invention, the lubricating holes are provided with a step in the direction towards the ball bearings decreasing in diameter. The step provides an abutment for the annular end face of the fine tube nozzle of the grease gun, so that it is particularly easy to apply the gun, the nozzle being introduced into the larger diameter portion of the lubricating hole. Of course, the aforesaid lubricating hole portion is adapted in its diameter to the external diameter of the said grease gun nozzle.

In principle, the axis of the lubricating holes in the angle handpiece according to the invention can be disposed parallel to the central axis of the head housing.

However, it has been found that it is expedient if according to a further proposal of the invention the axis of each lubricating hole is inclined towards the central axis of the head housing in a direction away from the housing. In this way the air which is rotated in the disc-shaped internal space formed by each of the two end walls of the head housing due to the rotation of the ball bearings and which is forced outwardly by centrifugal force, and which is mixed with oil to a greater or less degree, is prevented from escaping from the lubricating holes, thus preventing or at least reducing any adverse effect to the patient by a strong discharge of air mixed with grease.

The advantageous action described can be further augmented if, according to a further proposal of the invention, the axis of each lubricating hole extends obliquely from the outside towards the inside relatively to the head housing in the direction of rotation of the rotor shaft.

In the two last-mentioned arrangements it is sufficient if according to a further feature of the invention, the axis of the lubricating hole portion which has the smaller diameter is arranged at an inclination.

The advantageous effect which can be achieved with the two last-mentioned forms of embodiment can be further promoted if, according to the invention, the sidewall of the disc-shaped inner space formed by each of the two end faces is constructed, for example, in the form of a generated frustoconical shape narrowing from the inside towards the outside. Due to this construction, as a result of centrifugal force any grease particles projected against the sidewall of the disc-shaped space are constrained to slide along the sidewall in the direction of widening of the frustoconical space i.e., back towards the bearings and are thus prevented from issuing from the lubricating holes.

The invention can also advantageously be used with angle handpiece heads of the type which are provided with a spray conduit leading to a distributor duct which is arranged in the tool-side end wall and extends in the form of an arc about the rotor shaft, spray nozzles being provided which extend from the distributor duct and open outwardly through the end wall. In an angle handpiece head of this kind, the invention contemplates that the arc length of the distributor duct corresponds to an arc angle of between about 200° to about 300°, and the lubricating holes are arranged between the ends of the distributor duct outside the said duct.

DETAILED DESCRIPTION

Figure 1:
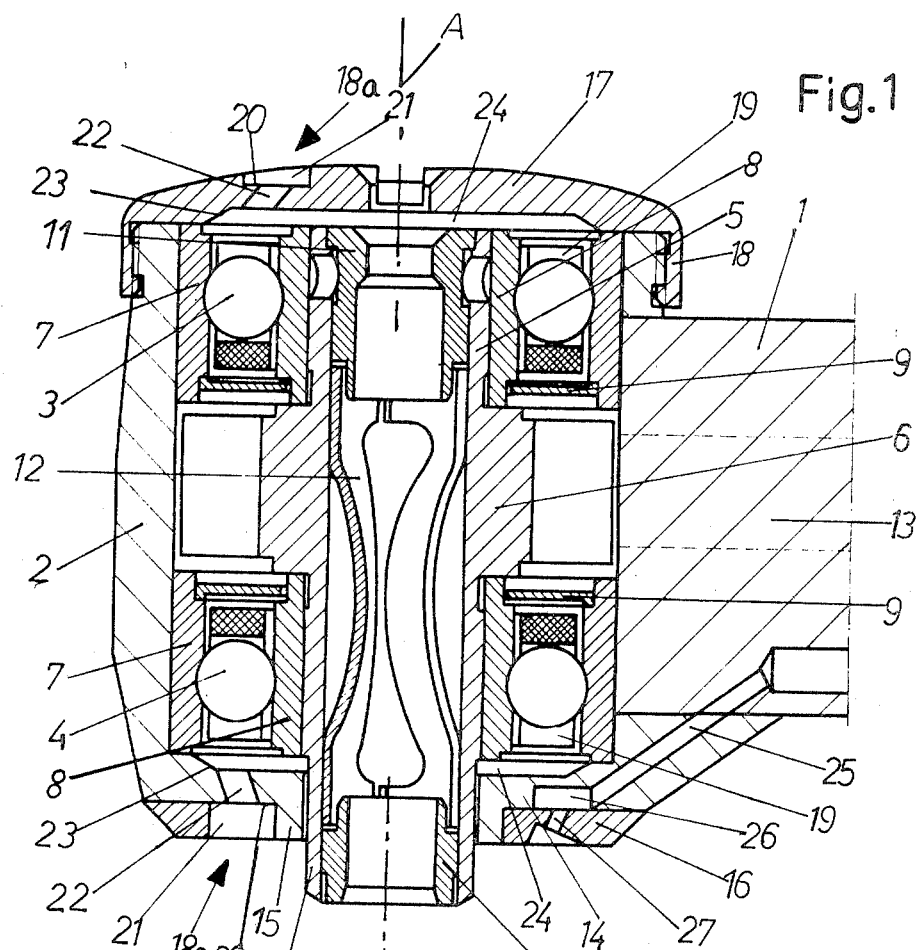
FIG. 1 is an axial sectional view of a turbine angle handpiece head.

Numeral 1 designates the shank of the turbine angle handpiece head. The angle handpiece head has a cylindrical peripheral wall or housing 2 at the end of the shank 1. A rotor shaft 5 of a turbine impeller 6 is mounted in ball bearings 3, 4 in the turbine angle handpiece head. The ball bearings 3, 4 include outer races 7 and inner races 8. At the side facing the turbine impeller 6, the ball bearings 3, 4 are each shielded by an annular closure cover 9.

As seen in FIG. 1 the rotor shaft 5 has hollow shaft journals 10 in which are inserted sleeves 11 which define the position of clamping tongues 12 arranged in the rotor shaft 5 for securing a tool (not shown) and insuring that it is entrained by the rotor shaft 5.

Compressed air for driving the turbine impeller 6 is fed through a feed duct (not shown) and discharged from a duct 13 shown in broken lines in FIG. 1.

The lower end wall 14 nearest the tool is integral with the peripheral wall 2 and is provided at its center with an aperture for the passage of the shaft journal 10. An annular collar 15 surrounds the central aperture. A step is thus formed in the end wall 14 and an annular cover disc 16 is inserted and secured in the step, for example, by gluing.

At the other end of the head (opposite end wall 14) there is a cover 17 which comprises a projecting rim 18 which is screwed onto the peripheral wall 2.

At the opposite ends of the head there are provided respective lubricating holes generally indicated by 18a. The lubricating holes 18a are directed towards annular spaces 19 which open at the end walls and are situated between the inner races 8 and the outer races 7 of the ball bearings 3, 4. The ball bearings 3, 4 can therefore be lubricated by injecting lubricant through holes 18a into the annular spaces 19 in the bearings.

As shown in FIG. 1, the lubricating holes 18a in the end walls decrease in diameter stepwise in the inward direction towards the ball bearings 3, 4 and form respective steps 20. The steps 20 serve as abutment faces for the ends of lubricating guns (not shown) which are externally applied. Each hole has a larger diameter portion 21 and a smaller diameter portion 22. The portion 22 is sufficiently small to enable lubricant to be forced into the bearings during a lubrication operation while inhibiting external discharge during normal operation.

Figure 2:
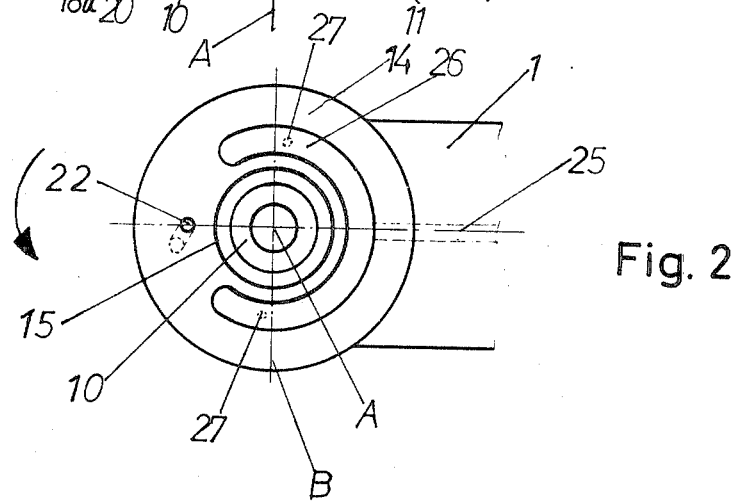
FIG. 2 is an end view of the turbine angle handpiece head of FIG. 1 in the direction of the tool-side end wall, the lower annular cover disc shown in FIG. 1 being omitted.

The axis of each lubricating hole portion 22 is inclined with respect to the theoretical central axis A of the head housing 2 in a direction towards said axis and outwardly of the head housing. As is seen in FIG. 2, the axis of the lubricating hole portion 22 is also inclined from the outside towards the inside in the direction of rotation of the rotor shaft 5, 10. The direction of rotational movement of the rotor shaft 5, 10 is indicated by the arrow in FIG. 2. This double inclination of hole portion 22 inhibits discharge of lubricant from the hole portion 22.

As a further means of inhibiting discharge of lubricant from the bearings, the sidewall 23 of the disc-shaped inner space 24 formed by each of the two end walls and the respective covers 16 and 17 narrows from the inside towards the outside in frustoconical form. Thereby, any lubricant escaping from the bearings tends to flow back thereto by centrifugal force along the inclined sidewalls 23 of spaces 24.

Numeral 25 designates a spray conduit leading to a distributor duct 26. The distributor duct extends in the form of an arc about the rotor shaft 5, the arc length of the distributor duct 26 extending through an arc angle of about 270° as shown in FIG. 2. Extending from the distributor duct 26 are spray nozzles 27 which open externally through the cover disc 16.

As shown in FIG. 2, the lubricating hole portion 22 in the end wall 14 nearest the tool opens between the ends of the distributor duct 26 in spaced relation from said duct, in order to prevent communication between the lubricant in the bearings and the spray medium being discharged from the nozzles 27.

According to FIG. 2, the spray nozzles 27 are diametrically opposed and somewhat offset relative to an axis B which is perpendicular to an axis passing through the mouth of the lubricating hole portion 22 and axis A. The above offsetting of nozzles 27 is provided so that due to the rotational movement of the tool and the shaft journal 10, the spray jets issuing from the spray nozzles 27 directed from the interior of the head housing outwardly towards the central axis A are deflected into a plane situated at right angles to the plane of the drawings through the axis B. This prevents the spray jets from hindering vision in the region being drilled.

It should be noted that a spray nozzle 27 has been shown in FIG. 1 only for purposes of illustration whereas in actuality it is situated in a plane turned about 90° relative to the plane of the drawing.

What is claimed is:

1. A dental angle handpiece head comprising a housing; two ball bearings in said housing; and a rotor shaft mounted in said ball bearings and adapted for receiving a dental tool; said ball bearings each including spaced inner and outer races, said housing having opposite ends and being provided at each of said ends with at least one lubricating hole extending into communication with the space between the inner and outer races of a respective bearing, said housing having a central axis coincident with the shaft, each lubricating hole being offset from the central axis and inclined theretoward in a direction extending away from the housing, each lubricating hole also being inclined in said housing in the direction of rotation of the rotor shaft, each lubricating hole having a first portion of smaller diameter and a second portion of larger diameter to form a step therebetween, the smaller diameter portion extending towards the space between the races, only said smaller diameter portion being inclined.

2. A head as claimed in claim 1 wherein said housing is provided with a disc-shaped space at each of the ends thereof between said holes and the spaces between the races of the respective bearings, said housing having sidewalls bounding the disc-shaped spaces which are conical and narrow in a direction outwardly of the housing.

3. A head as claimed in claim 1 comprising distributor means for a spray medium at that one of the ends of the housing facing the tool, said distributor means being constituted by a distributor duct in said one end of the housing and spray nozzles in communication with said duct and opening externally of the housing, the lubricating hole in said one end being isolated from said distributor duct.

4. A head as claimed in claim 3 wherein said housing has a central axis coincident with said shaft and said distributor duct extends around said axis over an arc of between 200° and 300°, said duct having opposite ends between which the lubricating hole in said one end is located.

* * * * *